United States Patent [19]

Audran et al.

[11] 3,928,709

[45] Dec. 23, 1975

[54] FERROUS FERRIC OXIDES, PROCESS FOR PREPARING SAME AND THEIR USE IN MAGNETIC RECORDING

[75] Inventors: Roger G. L. Audran, Vitry-Sur-Seine; Bernard J. Pinguad, Vincennes, both of France

[73] Assignee: Eastman Kodak Company, Rochester, N.Y.

[22] Filed: Sept. 7, 1973

[21] Appl. No.: 395,220

Related U.S. Application Data

[63] Continuation-in-part of Ser. No. 230,915, March 1, 1972, abandoned, which is a continuation-in-part of Ser. No. 74,533, Sept. 22, 1970, abandoned.

[30] Foreign Application Priority Data

Sept. 13, 1972 France.............................. 72.32367

[52] U.S. Cl. ............ 428/539; 252/62.56; 252/62.6; 252/62.62; 252/62.63; 423/633; 428/900
[51] Int. Cl.²......................................... C09G 49/08
[58] Field of Search............. 252/62.6, 62.56, 62.62, 252/62.63; 423/633, 634; 106/304; 117/239

[56] References Cited
UNITED STATES PATENTS

| | | | |
|---|---|---|---|
| 2,941,901 | 6/1960 | Prill et al. ............................ | 117/239 |
| 3,075,919 | 1/1963 | Gruber et al. ............... | 252/62.56 X |
| 3,149,996 | 9/1964 | Wagner et al. ..................... | 117/239 |
| 3,288,563 | 11/1966 | Klomp et al. ................. | 252/62.56 X |
| 3,761,311 | 9/1973 | Perrington et al. .................. | 117/239 |
| 3,795,542 | 3/1974 | Halaby et al.................. | 252/62.56 X |

FOREIGN PATENTS OR APPLICATIONS 1,157,156    5/1958    France

*Primary Examiner*—Jack Cooper
*Attorney, Agent, or Firm*—B. D. Weise

[57] ABSTRACT

Acicular ferrous ferric oxide crystals such as magnetite are prepared using a process which comprises mixing together aqueous solutions of a ferrous salt such as the sulfate or chloride and an alkali hydroxide such as NaOH or KOH to form a ferrous hydroxide precipitate as a dispersion, passing oxygen through the dispersion at 60°C or lower to convert ferrous hydroxide particles to αferric oxide hydrate crystals, discontinuing introduction of oxygen, boiling the dispersion to perfect crystallization of the αferric oxide hydrate, dehydrating the αferric oxide hydrate crystals to form αferric oxide and reducing the αferric oxide to form ferrous ferric oxide crystals.

As set forth in the following disclosure, the reaction conditions, reactant concentrations and other parameters of the process are carefully controlled to obtain acicular ferrous ferric oxide crystals that have an acicularity ratio of at least 15 and contain alkali metal ions that impart basicity to the crystals. These crystals can obtain one or more doping metal ions such as alkaline earth metal ions, ions of cobalt, nickel, chromium, zinc or manganese which modify the magnetic recording properties of the crystals. Magnetic recording products such as tapes, discs and the like, containing the ferrous ferric oxide crystals are also disclosed.

22 Claims, No Drawings

FERROUS FERRIC OXIDES, PROCESS FOR PREPARING SAME AND THEIR USE IN MAGNETIC RECORDING

This application is a continuation-in-part of our pending U.S. patent application Ser. No. 230,915 filed Mar. 1, 1972, now abandoned (based on our French application 7,109,090 filed in France Mar. 16, 1971, now French Patent No. 2,129,841 published Nov. 3, 1972) which in turn is a continuation-in-part of our U.S. Pat. application Ser. No. 74,533 filed Sept. 22, 1970, now abandoned (based on our French application 6,932,741 filed in France Sept. 25, 1969, now French Patent No. 2,060,273 published June 18, 1971.)

BACKGROUND OF THE INVENTION

This invention relates to magnetic recording, to materials that are useful in magnetic recording, the preparation of such materials and products for magnetic recording which contain such materials. In one of its aspects, this invention relates to acicular ferrous ferric oxide ($Fe_3O_4$) exhibiting characteristics that make it particularly useful in the preparation of high performance magnetic records such as tapes, discs, sheets, stripes and the like. In another of its aspects, this invention relates to a process for producing such ferrous ferric oxide crystals and products for magnetic recording containing them.

The use of magnetic recording in various technical fields in increasing and constant effort is made to extend the range of its possibilities. It is particularly desired, in the fields of sound and image recording to have available magnetic layers that are capable of storing signals of shorter and shorter wavelengths without sacrificing the quality of reproduction of the signals.

It is known that the end use capabilities of magnetic webs and surfaces such as tapes, discs, drums, and striped motion picture films for recording and reproduction of sounds, images or other signals are closely related to the properties of magnetizable iron oxides employed in such materials. At the present time the most frequently used magnetizable iron oxide is acicular gamma ferric oxide ($\gamma Fe_2O_3$) which generally has a length below about 1 micron. Such gamma ferric oxide is normally obtained from alpha ferric oxide hydrate (goethite) by a process involving a reduction to acicular ferrous ferric oxide, $Fe_3O_4$ (magnetite) followed by oxidation. The ferrous ferric oxide can be prepared in acicular particle form but, in the past, it has not been extensively used as a magnetic recording material on account of oxidation and erasure difficulties.

In order to increase the coercivity of gamma ferric oxide for recording short wavelengths, this material has been doped with metal ions such as cobalt. However, doping with cobalt results in a certain number of disadvantages such as deleteriously effecting the stability of the magnetic properties with respect to temperature and mechanical stresses. In addition, during successive read-outs of magnetic elements such as magnetic tape containing this material, the output level tends to decrease. Such disadvantages of gamma ferric oxide doped with cobalt are well-known and are described, for example, in an article of J. R. Morrison and D. E. Speliotis in IEEE Transactions on Electronic Computers, Vol. EC-15, No. 5 (1966), pages 782–793.

It is also well-known that materials such as gamma ferric oxide which are employed in magnetic recording have static problems which are often remedied, for example, by incorporation of carbon in the magnetic layer as described in French Patent No. 1,119,077, by using a conductive sub-layer as described in French Patent Nos. 985,701, 1,273,334, 1,479,574 or by using a conductive backing as described in French Patent No. 1,273,334.

It is evident, therefore, that the state of the magnetic recording art will be enhanced by providing a magnetic recording material which is not subject to many of the aforesaid disadvantages associated with gamma ferric oxide used in magnetic recording. It is also evident that the magnetic recording art would be enhanced by the availability of an acicular ferrous ferric oxide, doped or undoped, exhibiting magnetic properties which make it possible to extend its usefulness in magnetic recording. Furthermore, it is obvious that the preparation of such a ferrous ferric oxide, and magnetic recording elements containing it, would also represent a significant advance in the art.

SUMMARY OF THE INVENTION

In accordance with this invention it has been found that a process described in our co-pending U.S. patent application Ser. No. 230,915 filed Mar. 1, 1972 now abandoned will provide acicular ferrous ferric oxide exhibiting a unique combination of properties that makes it particularly useful in magnetic recording. This acicular ferrous ferric oxide, as more fully disclosed hereinafter, exhibits a very high ratio of length to width, i.e., has a acicularity ratio of at least 15 and contains alkali metal ions which impart basicity to the oxide. This acicular ferrous ferric oxide represents a significant step in overcoming the difficulties in erasure and problems of recording instability which have seriously limited consideration of prior art ferrous ferric oxides as magnetic recording materials. Ferrous ferric oxides containing doping metal ions such as cobalt, as described herein, in comparison to similarly doped prior art gamma ferric oxides exhibit an increased coercivity for comparable levels of doping ion and a smaller change in coercivity with change in temperature for a given coercivity. They also exhibit a positive magnetostriction which the gamma ferric oxide does not.

As indicated, the invention includes an acicular ferrous ferric oxide having an acicularity ratio of at least 15 and containing alkali metal ions which impart basicity to the oxide. The basicity of the oxide is at least about 0.04 meq. per gram of oxide and is generally in the range of about 0.04 to about 0.2 meq. per gram of oxide. The acicular ferrous ferric oxide can contain doping metal ions for the oxide in addition to the alkali metal ions. Such doping ions modify the magnetic recording characteristics of the oxide. A preferred dopant known in the prior art is cobalt, although other polyvalent metal doping ions such as ions of zinc, nickel, chromium and cadmium have also been employed to modify the magnetic recording characteristics of an oxide. In addition to such metal ions, the ferrous ferric oxide crystals of this invention can contain other doping ions such as ions of alkaline earth metals, e.g. calcium, as more fully described hereinafter.

The present invention also includes a process for the preparation of acicular ferrous ferric oxide crystals in which ferrous hydroxide particles are precipitated under alkaline conditions and oxidized to α ferric oxide hydrate crystals. These crystals are then dehydrated to form alpha ferric oxide crystals which are in turn reduced to form ferrous ferric oxide crystals. The process conditions and reactant concentrations are carefully controlled to obtain the improved ferrous ferric oxide crystals described herein. The process steps, except for separation or isolation of the ferrous ferric oxide, are set forth in our co-pending application U.S. Ser. No. 230,915 filed Mar. 1, 1972 now abandoned. The process of this invention will be more fully discussed hereinafter.

The present invention also includes a product for magnetic recording which comprises a support and acicular ferrous ferric oxide, as described herein. This magnetic recording element can contain one or more magnetic recording layers comprising acicular ferrous ferric oxide crystals containing alkali metal ions with or without other doping metal ions for the oxide. These oxides can be used as the sole magnetic material in these elements or they can be used in admixture with other magnetic substances in recording layers, as will be described in greater detail hereinafter.

DESCRIPTION OF PREFERRED EMBODIMENT

In general, in practicing this invention, an acicular ferrous ferric oxide such as magnetite is prepared by mixing together aqueous solutions of a ferrous salt such as the sulfate or chloride and an alkali hydroxide such NaOH of KOH to form a ferrous hydroxide precipitate as a dispersion, passing oxygen through the dispersion at 60°C or lower to convert ferrous hydroxide particles to α ferric oxide hydrate crystals, discontinuing introduction of oxygen, boiling the dispersion to perfect crystallization of the α ferric oxide hydrate crystals, dehydrating the α ferric oxide hydrate crystals to form α ferric oxide and reducing the α ferric oxide to form ferrous ferric oxide crystals. These process steps, reaction conditions, reactant concentrations and variations in the process will be more fully described hereinafter.

The reactions for converting alpha ferric oxide hydrate to ferrous ferric oxide are as follows:

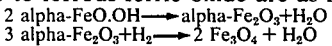

$$2\ alpha\text{-}FeO.OH \longrightarrow alpha\text{-}Fe_2O_3 + H_2O$$
$$3\ alpha\text{-}Fe_2O_3 + H_2 \longrightarrow 2\ Fe_3O_4 + H_2O$$

In the process the ferric oxide hydrate crystals are prepared by dispersing an aqueous solution of a ferrous salt in an aqueous alkaline solution, under non-oxidizing conditions. One way to do this is to bring the ferrous salt solution toward a lamellar suction zone created in the midst of the alkaline solution where it undergoes a lamellar stretching such that it penetrates the alkaline solution in a very large surface area instead of in a limited area of excessively high ferrous salt concentration. When using such a technique, purging of the reaction vessel or blanketing of the solution with a non-oxidizing gas is not required. By an alkaline solution we mean a solution of a compound which will react with the ferrous salt to precipitate ferrous hydroxide, eg., an alkaline hydroxide of one of the alkali metals such as sodium or potassium. By non-oxidizing conditions in this application, such that there is no adverse effect upon subsequent complete oxidation to α ferric oxide hydrate we mean that oxygen is excluded from contact with the reacting solutions to such an extent that at the end of the precipitation the ferric ion content in the dispersion is less than 1%, by weight, of the ferrous ion content, as ascertained by potentiometric measurements and analysis.

The above introduction of ferrous salt solution can conveniently be accomplished by a device which makes it possible to violently disperse and intermix the ferrous salt rapidly while the liquid-air interface is maintained sufficiently calm that an undesirable amount of air is not introduced into the solution from the ambient atmosphere, which avoids any localized imbalance of reagent concentrations, one in another, and which also can be used for the subsequent introduction of oxygen, eg., as pure oxygen or as air into the dispersion. There are many ways of conducting such a controlled reaction. A suitable device is described in French Patent No. 1,157,156 and the corresponding U.S. Pat. No. 2,996,287. This device, herein called a rotary saucer, comprises two coaxial cones, opposed at their bases and very close to each other, carried on a hollow shaft, with openings which enable communication between the interior of the shaft and the immersing liquid volume between the two opposed cones, and thence through the open area on the periphery located between the two cones. The shaft is connected to a motor device which imparts to the shaft and to the cones a rotary movement (a rotational speed of about 2800 rpm for cones of about 8 inch diameter is suggested as a starting point from which an optimum value can be ascertained). This assures a centrifugal effect on the fluids that are in contact with the walls of the cones. Suitable valves permit adding liquids or introducing air and other gases through the hollow shaft. First the solution of ferrous salt is admitted to the hollow shaft, and thereupon the liquid particles escaping from this shaft and from between the cones in this area can be rapidly and widely dispersed in the liquid mass wherein the cones turn.

Of course, if other techniques for achieving intermixing are employed, an oxygen free atmosphere above the reactants can also be assured by maintaining a blanket of inert gas such as nitrogen or argon over the surface of the reactants so that premature oxidation does not occur.

After rapid dispersion of the solution of ferrous salt into the alkaline solution, the precipitated ferrous hydroxide is oxidized so that the nucleation and growth of the cyrstalline nuclei proceed with great uniformity. In order to assure a constant speed to this reaction, air is next admitted to the hollow shaft, whence it is sucked into and dispersed in the suspension by means of the rotation of the shaft and more especially on the attached saucer. The air must be admitted in progressively increasing volumes because the thickening of the suspension makes the solid-gas exchange and the diffusion of the oxygen progressively less efficient. When oxidation is completed, the dispersion or suspension is brought to boiling and boiled for a short time, such as one half hour or one hour, in order to complete and perfect the crystallization of α ferric oxide hydrate. Then the dispersion is filtered and the crystals are washed and dried.

The conditions for precipitation and oxidation of the ferrous hydroxide with the aid of the rotatory saucer depend on various factors, such as the concentration of the ferrous solution, the excess of the alkaline solution, the duration of the precipitation and of the oxidation, as well as the reaction temperature. The concentration and quantity of the starting ferrous solution is such that the α ferric oxide hydrate content of the oxidized dispersion does not exceed 15 g. per liter.

The excess of the alkaline hydroxide in solution that is used with respect to the necessary stoichiometric quantity to precipitate all the ferrous salt as ferrous hydroxide is about 500% or more at the end of the reaction, ie., there remains in solution at least about 5 times the alkaline hydroxide required to convert all the iron salt to the hydroxide. The concentration of the dissolved alkaline compound does not remain the same during the precipitation of the ferrous hydroxide and during its oxidation, since it is advantageous to dilute the slurry before beginning the oxidation. In one embodiment, the $Fe(OH)_2$ compound is precipitated in an alkaline solution containing at least 250 g/l of alkaline compound, the readjustment to a concentration that will provide no more than 15 g/l of the finally produced FeO.OH being done by adding water after all of the $Fe(OH)_2$ is precipitated.

A precipitation carried out with a lower excess of alkaline compound leads to the forming of complexes which are then oxidizable to alpha FeO.OH only after excessively long periods of oxidation, and the final properties of the crystals so obtained are poorer than those of the crystals prepared with an excess of alkaline solution on the order of about 500% or more.

The undesirable phenomenon is still more pronounced if the alkaline solution is poured into the acidic ferrous solution, instead of vice versa; the precipitation of the $Fe(OH)_2$ begins under these conditions in an acid medium and is completed in a basic medium. Such a process requires that subsequent oxidation be spread over one hundred hours or so in order that the complexes that are formed do not decompose to products other than α ferric oxide hydrate.

In practicing this process the alkaline solution employed can be a hydroxide of any of the alkali metals chosen from group 1a of the periodic table, eg., caustic soda or caustic potash. The ferrous salt used can be any salt or hydrate thereof that is sufficiently soluble to make the starting solution and which will not complex the ferrous hydroxide. Ferrous chloride having four molecules of water, ferrous nitrate, or ferrous sulfate having seven molecules of water are common examples of such salts.

The precipitation of ferrous hydroxide is done rapidly (advantageously in less than 10 minutes) and with minimum exposure to air and certainly without the introduction of any air.

When the oxidation of ferrous hydroxide is carried out at constant oxidation rates, through control of the rate of air admission, and the maintenance of constant temperatures, and alkaline hydroxide concentrations, the length of the needles increases as the precipitation and oxidation periods increase from several minutes to several hours. Moreover, an increasing heterogeneity of the crystals is noted as the precipitation and oxidation periods are made longer. This latter phenomenon results from the fact that the initially precipitated hexagonal ferrous hydroxide slowly oxidizes to acicular alpha FeO.OH After a time, the two compounds are both present. The operating conditions are then such that there is simultaneously enlargement of the existing needles and formation of new microcrystalline acicular nuclei, a process which increases the heterogeneity of the product.

The time required to complete the oxidation of the ferrous hydroxide is a very important factor. It depends on the rate at which oxygen is introduced in the suspension, and on the concentration of the precipitated product.

Oxidation is started about 30 minutes after terminating the inflow of the ferrous solution so that all the ferrous hydroxide can be precipitated. In order to obtain homogeneous crystals of α ferric oxide hydrate the growth of the crystalline nuclei must progress smoothly, which requires control of the oxidation rate in the manner described above.

The duration of oxidation generally does not exceed three hours but, if desired, longer periods can be used. For longer durations, the α ferric oxide hydrate needles attain a length of 0.5 micron or greater e.g., 0.8 micron acicular particles in 5 hours of oxidation.

The temperature during precipitation and oxidation is lower than 60°C. When the temperature increases, the length of the crystals does not change significantly, but the diameter of the crystals increases and the acicularity ratio decreases correspondingly. At a still higher temperature, cubic ferrous ferric oxide crystals are formed directly with the length of the cube edge being about the length of the acicular particles that would have formed at lower temperatures.

When the oxidation is completed, the suspension of the alpha FeO.OH particles in its strongly alkaline mother liquor is brought to boiling. This operation facilitates the diffusion of the alkaline ions from the mother solution into the crystal lattice.

The above procedure produces crystals having sodium ions in the crystal lattice (or potassium or other alkali metal if potassium hydroxide or other alkali hydroxide is used in the initial alkaline solution). Other doping ions can be introduced into the crystals. For example, alkaline earth metal ions such as calcium ions can be introduced in the washing step by washing the crystals with water to which such ions have been added, such as calcium chloride or bicarbonate. Other doping ions of polyvalent metals such as those of cobalt, nickel, chromium, zinc or manganese can be introduced by dissolving suitable water soluble compounds (eg., sulfates or nitrates) in the initial ferrous salt solution in appropriate quantities. As is known in the art, the ferrous ferric oxides can also be doped after formation of the crystals.

In a preferred embodiment of this invention, doped ferrous ferric oxide is obtained from doped ferric oxide hydrate according to the following procedure:

A solution of ferrous salt containing a small quantity of cobalt salt is dispersed at a temperature below 60°C and in the absence of oxidizing agent, in an alkaline solution which is employed in a concentration of at least 500% stoichiometric excess. The ferrous salt solution is directed toward a suction area created in the midst of the alkaline solution where it undergoes lamellar stretching and penetrates into the alkaline solution in the form of a sheet of large specific area which avoids any substantial local stoichiometric excesses of the ferrous salt. Oxygen is then introduced into the dispersion at a temperature of about 20° to about 60°C for a period of time sufficient to convert the ferrous hydroxide particles to crystals of α ferric oxide hydrate. The concentration of the ferrous salt solution is such that the concentration of α ferric oxide hydrate in the final oxidized dispersion is less than about 15 grams per liter. The dispersion is then boiled to effect further crystallization of the α ferric oxide hydrate crystals and the crystals separated by filtering, washing and drying. In this procedure the precipitation of ferrous hydroxide can be accomplished in at least partially dimineralized water and the wash water can contain alkaline earth metal ions such as calcium ions.

The α ferric oxide hydrate doped with cobalt ions, obtained as described above, is then transformed into a doped ferrous ferric oxide by the following heat treatments.

In a first phase, the doped ferric oxide hydrate is dehydrated at a temperature of about 270°C, to obtain doped alpha ferric oxide. This ferric oxide is then heated at a temperature between about 300°C and 500°C, in the presence of a reducing gas such as hydrogen. The product is cooled to room temperature in an inert atmosphere, eg., in a nitrogen atmosphere. The composition of the doped ferrous ferric oxide obtained will depend on the duration and on the reduction temperature which is advantageously in the range of about 325°C to about 425°C for a period of 10 to about 45 minutes. The composition can correspond to the theoretical magnetite composition of 33%, by number, of ferrous ions based on total iron ions, but lesser concentrations eg., 20–25%, are possible.

The acicular ferrous ferric oxide prepared as described hereinbefore exhibits a basic reaction. This basicity can be determined by dispersing the iron oxide by means of energetic stirring in glacial acetic acid. The analysis is effected by potentiometry by means of a titrated solution of perchloric acid dissolved in nitromethane. The alkalinity measured on the ferrous ferric oxide samples is at least 0.04 meq/g (milliequivalents per gram) of oxide, and generally is between 0.04 and about 0.2 meq/g.

This alkalinity is characteristic of products obtained according to the above process which is described in co-pending U.S. patent application Ser. No. 230,915 filed Mar. 1, 1972 now abandoned. It can be enhanced by introducing alkaline earth metal ions such as calcium ions, which play an important role in the thermal stability of our novel acicular ferrous ferric oxide. Such ions are preferably precipitated as the hydroxide e.g., as $Ca(OH)_2$, on the α ferric oxide hydrate and the Ca ions remain when the hydrate is converted to ferrous ferric oxide. The concentration is advantageously between about 0.25 and about 1%, by weight, of alkaline earth metal, e.g. calcium, on the basis of the iron oxide.

The ferrous ferric oxides of this invention exhibit a very high average length to width ratio, called their acicularity ratio of simply acicularity, in comparison to prior art oxides. The acicularity ratio of the ferrous ferric oxide particles of this invention is at least about 15 and can be at least 20, 40 or even more. The average particle length is less than 1 micron, often in the range of about 0.2 to about 0.8 microns. In addition, the novel crystals of this invention exhibit a very uniform size distribution or homogeneity in the sizes of the crystals. This homogeneity can be observed with an electron microscope and established by counting particles of the same length, and by the contour of the distribution curves. This operation is done, preferably, on the nonmagnetic intermediate α ferric oxide hydrate crystals, as its crystals are more easily individually recognizable.

The particle size distribution of α ferric oxide hydrate (goethite) crystals by size follows a normal logarithmic equation:

$$\frac{dN}{dl} = N \sqrt{\frac{K}{\pi}} \frac{1}{l} \exp\left[-K \left(\text{Log} \frac{l}{L_m}\right)^2\right]$$

wherein $N$ represents the number of crystals of length $l$, $L_m$ represents the average value of the length, and $K$ and coefficient of polydispersion. This coefficient $K$ is above 2 for the oxides according to the invention.

As previously indicated, the magnetic properties of the ferrous ferric oxide of the invention can be modified by doping with one or more polyvalent ions of such metals as cobalt, nickel, zinc, manganese or chromium and many others. Such metal doping ions can cause a desirable increase in acicularity ratio when coprecipitated simultaneously with the ferrous hydroxide, as described hereinbefore. Moreover, when the ferrous ferric oxide of this invention contains cobalt, it exhibits an extremely high coercivity or coercive field. The coercive field of the doped oxide depends, naturally, on the concentration of cobalt included in the oxide, and on the temperature at which one carries out the transformation of the doped α ferric oxide hydrate to doped ferrous ferric oxide. The concentration of cobalt or other doping metal ions can vary but generally it is advantageously between about 1 g and about 6 g of metallic cobalt per 100 g of oxide, i.e., about 1 to about 6%, by weight, based on oxide. According to a preferred mode of the invention, the amount of metallic cobalt is between about 2 g and about 4 g per 100 g of oxide, and the coercive field of the doped ferrous ferric oxide is in the order of about 600 oersteds to about 900 oersteds. It is significant to note that the coercive field of the doped oxides according to the invention is generally about 100 to about 150 oersteds above that of the correspondingly doped gamma ferric oxide prepared from the same α ferric oxide hydrate. Moreover, the remanence of the doped oxides of the invention is generally about 10% above that of the correspondingly doped gamma ferric oxide prepared from the same α ferric oxide hydrate.

The acicular ferrous ferric oxide of this invention can be employed in products for magnetic recording. These oxides can be used in one or more magnetic recording layers coated on a support or they can be incorporated into self supporting polymer layers. For the manufacture of a web such as magnetic tape with the ferrous ferric oxide of this invention, it is convenient to disperse the oxide in a solution of a suitable binder eg., a polymer binder in a volatile solvent for the binder, and then apply the resulting dispersion in the form of one or more thin layers on a support and allow the solvent to evaporate. Among binders that are useful in accordance with the invention are, in particular, vinyl acetate vinyl chloride copolymers; vinylidene chloride acrylonitrile copolymers; acrylic and/or methacrylic ester copolymers; polyvinyl butyral; butadiene styrene copolymers; terpolymers of acrylonitrile, vinylidene chloride and maleic anhydride or maleimide, cross-linked or non-cross-linked copolycondensates such as polyamides, polyurethanes, polyesters, etc., or mixtures of these binders. Many other binders with similar chemical and physical properties are well-known and can be employed. Particularly advantageous results can be obtained by using a vinyl acetate vinyl chloride copolymer, partially hydrolized and optionally cross-linked with an isocyanate, or by using polyurethanes, or else a mixture of these binders. The concentration of binder with respect to the magnetic oxide is in the range of about 10, often about 20 to about 40%, by weight, based on the magnetic oxide. Preferably this concentration is in the range of about 15 to about 25%, by weight. Suitable solvents include methylethylketone, methylisobutylketone, ethyl acetate, butyl acetate, cyclohexanone, and mixtures thereof.

Magnetic recording elements according to the invention can also contain other magnetic materials such as gamma ferric oxide in separate layers or in the same layer with the acicular ferrous ferric oxides of this invention. Such elements can also contain additives in the magnetic layer such as oleic acid or another dispersing agent in order to facilitate dispersion or a lubricant such as the carbonic ester compounds described in French Patent No. 2,094,663 (eg. ethyl cetyl carbonate, ethyl lauryl carbonate, didodecyl carbonate).

The magnetic layer according to the invention can be applied to a wide variety of non-magnetizable supports, including belts, discs, paper or film tapes and the like. Suitable supports are generally flexible and include such materials as cellulose triacetate, polyvinyl chloride, or polyester such as poly (ethyleneterephthalate). It can also serve for coating any other support. According to one embodiment of the invention, the product for magnetic recording comprises at least two superimposed magnetic recording layers on the same surface of the support and the acicular ferrous ferric oxide of this invention is in the outermost recording layer. For example, a layer containing gamma ferric oxide is first coated on a support and then over this layer is coated a layer containing a doped ferrous ferric oxide according to the invention, particularly an oxide doped with cobalt. Another embodiment of the invention is a magnetic tape comprising a support and a single magnetic recording layer that contains a doped ferrous ferric oxide according to the invention, in particular an oxide doped with cobalt.

The products for magnetic recording of this invention, particularly those containing a single magnetic recording layer according to the invention, have a high coercive field. The coercive field depends, as indicated previously, on the ferrous ferric oxide that is used, particularly on its content of doping metal ion, and also on the temperature at which one has carried out the process of transformation of the $\alpha$ ferric oxide hydrate to ferrous ferric oxide. This coercive field is, in general, of the order of about 600 oersteds to about 1100 oersteds and, advantageously, of the order of 700 oersteds to 900 oersteds. The remarkably high coercive field of the oxides according to the invention makes it possible to obtain high-density recording of the data.

As indicated previously, the magnetic recording materials of this invention, eg., magnetic tapes containing a single magnetic recording layer exhibit exceptional heat stability. This heat stability can be observed by measuring variation of the coercive field as a function of the temperature. For an identical coercive field at 20°C, magnetic tapes of this invention exhbit a decrease in the coercive field which is only about one half that observed with magnetic tapes containing doped gamma ferric oxide.

The doped ferrous ferric oxide magnetic tapes of this invention also exhibit a positive magnetostriction. Thus, when a doped gamma ferric oxide magnetic tape having a polyester support 6.3 mm wide and 25 $\mu$ thick, the magnetic layer itself being 5 $\mu$ thick is submitted to a longitudinal traction force of 1 Kg it loses up to 10% of its coercive field. In contrast, when the same stress is applied to a tape which has the same support, the same width and the same thickness, but comprising a doped ferrous ferric oxide layer, the magnetic characteristics of the tape are improved. In this latter case the coercive field is increased by approximately 3% for a tape containing ferrous ferric oxide doped with cobalt at a level of about 2,5%, by weight, with respect to the oxide. The magnetic tapes of the invention thus exhibit a substantial advantage with respect to magnetic tapes generally employed in the trade. This is a significant feature of this invention since it is known that magnetic tapes are subjected to stresses in recording and reading apparatus that cause a decrease in coercivity which results in an alteration in the signal. The magnetic tapes of the invention do not show this disadvantage. This is particularly true in the case of tapes containing a single magnetic recording layer of doped ferrous ferric oxide which actually show an increase in coercivity.

The elements of this invention exhibit still another advantage over magnetic tapes employing gamma ferric oxide as the magnetic recording material. Thus, at short wavelengths that are often used for recording images, the tapes of this invention give an output level which is substantially above that obtained with magnetic tapes containing gamma ferric oxide. For a given coercive field, e.g. a coercivity of 700 to 800 oersteds, the output level of the magnetic tapes of this invention is generally at least about 2 dB to 3dB above that of gamma ferric oxide tapes. To illustrate this point a Philips magnetoscope (LDL 1002 type) was used to make measurements on a magnetic tape of the invention and a gamma ferric oxide magnetic tape having the same coercive field. The curves representing the output level in dB was thus plotted as a function of the writing current in milliamperes (mA). The maximum of the curve corresponding to the tape of the invention which comprises a layer containing a ferrous ferric oxide doped with cobalt at about 3%, by weight, is approximately 4 dB above the maximum for the curve corresponding to the gamma ferric oxide magnetic tape.

It has also been noted that the loss of signal after a given number of successive passages of a tape of the invention is very small. In fact this loss is significantly less than obtained with a magnetic tape containing doped gamma ferric oxide. To illustrate, output-level measurements can be made as described hereinabove using a magnetic tape of the invention which contains a ferrous ferric oxide layer doped with cobalt in a concentration of about 3%. Similarly, measurements are made under the same conditions on a doped gamma ferric oxide magnetic tape exhibiting the same coercivity and surface smoothness as the tape of the invention. At a recording wavelength of 2.5$\mu$, the loss of signal is 0.5 dB after 10 passages for the tape of the invention, while the loss is in the order of 2 dB to 3 dB for the gamma ferric oxide tape.

The magnetic tapes of the invention, particularly those magnetic tapes having a single doped ferrous ferric oxide layer, exhibit superior static properties in comparison to prior art ferric oxide magnetic tapes. Thus, the resistivity of the doped ferrous ferric oxide materials of this invention is of the order of $1\times10^4$ ohms/cm in comparison to about $1\times10^9$ ohms/cm for the corresponding gamma ferric oxide material. The mentioned data are obtained by measuring the volumetric resistivity on samples of the oxides in the form of pellets, said pellets being obtained by agglomeration under a pressure in the order of 200 MPa (milli Pascal)

of the oxide powder.

The low resistivity of the doped ferrous ferric oxides of this invention greatly facilitates the flow of static charges. This makes it possible to eliminate a conductive sub-layer or a conductive backing in the tape. The manufacture of the magnetic tape is thus simplified substantially and is less expensive.

The invention is further illustrated by the following examples of its practice.

EXAMPLE 1

In a 10 liter container one introduces 3.5 liters of water and 500 g of NaOH (12.5 gm. moles) calculated to provide 730% excess. After complete solution, one stabilizes the temperature at 40°C. Then, one rapidly pours into the solution, by means of the stirring and dispersion system described in French Patent No. 1,157,156 and U.S. Pat. No. 2,996,287, 1 liter of aqueous ferrous sulfate solution containing 220 g/l of $FeSO_4 \cdot 7H_2O$ (0.76 gm. moles/liter), and then adds 2.5 liters of water at 40°C. Forty minutes after the end of the precipitation, one blows into the suspension, using the aforecited stirring system, compressed air at rates of flow progressively increasing from 5 l/h to 20 l/h. After 2 hours and 40 minutes of oxidation, when the reaction is completed, one brings the reaction mixture to boiling and boils for 1 hour, filters, washes with water, and then dries the resulting $\alpha$ ferric oxide hydrate yellow crystals. After thermal treatment of these needles by dehydration into alpha $Fe_2O_3$ at 270°C and reduction to $Fe_3O_4$ (ferrous ferric oxide) at 350°C one obtains an oxide having an alkalinity expressed in milliequivalents per gram (meq/g), of 0.04, an acicularity ratio between 20 and 25 and a sodium ion content in grams of sodium per 100 g of oxide of 0.06.

Using known procedures, the ferrous ferric oxide prepared according to this Example can be applied to a support in the form of a dispersion in a suitable binder, e.g. copoly (vinyl acetate vinyl chloride), to form a magnetic tape.

EXAMPLE 2

Using the procedure of Example 1, one prepares, in a 10 liter container, 3.5 liters of an aqueous solution containing 157 g of NaOH per liter. One stabilizes the temperature of this solution at 40°C, and rapidly pours into it 1 liter of an aqueous solution containing 225 g of ferrous sulfate and 10 g of cobaltous sulfate. One then dilutes the resulting dispersion with 2 liters of water. One effects the introduction of the ferrous salt solution using the system of agitation and dispersion described in French Patent No. 1,157,156 and U.S. Pat. No. 2,996,287. Forty minutes after the end of the precipitation, one blows into the dispersion using the aforecited system of agitation, compressed air at rates of flow progressively increasing from 5 l/h to 20 l/h. After 2 hours and 40 minutes of oxidation, one brings the reaction mixture to boiling for 45 min., filters, washes with water containing 100 ml/l of calcium ions and dries. One obtains ferric oxide hydrate needles doped with cobalt, having an acicularity ratio of 30 to 35.

One then places these doped crystals in an electric oven in controlled atmosphere. One progressively raises the temperature of the oven, at a rate of 8°C/mn, to 375°C. One then reduces the $\alpha$ $Fe_2O_3$ obtained i.e. the dehydrated oxide by proceeding as follows. After having purged with nitrogen, one feeds into the oven, now at 375°C, at a flow of 1.5 l/mn, a hydrogen current containing water vapor. After 40 mn, one stops the heating, and one cools the thusly obtain ferrous ferric oxide, under nitrogen, to room temperature. This oxide has a coercive field of 900 oersteds, an alkalinity of 0.04 meq/g and an acicularity ratio of 30 to 35.

Using procedures known in the art, one uses the ferrous ferric oxide doped with cobalt, prepared as described in this Example for a magnetic tape, by applying to a support a layer of a dispersion of the oxide in a copoly (vinyl acetate vinyl chloride) binder. One calenders the magnetic tape obtained and tests it on a Philips magnetoscope of the LDL 1002 type. The output level is approximately 4 dB above that of a tape having the same coercivity but containg doped gamma ferric oxide in the place of the doped ferrous ferric oxide of this invention. After 10 passages of the tape, one notes that the output level for the recording element of this invention has not decreased significantly.

EXAMPLE 3

Using the procedure of Example 1, one prepares, in a 10 liter container, 3.5 liters of an aqueous solution of 160 g of NaOH per liter. One pours into it rapidly, proceeding as in Example 1, 1 liter of an aqueous solution containing 225 g of ferrous sulfate, 7.5 g of cobaltous sulfate and 6 g of zinc sulfate. One then dilutes the resulting dispersion with 2.5 liters of water. After oxidation of the resulting dispersion in Example 1, one brings the dispersion to boiling for 40 min., filters, and washes the precipitate with water to remove undesirable salts and dries the obtained doped $\gamma$ ferric oxide hydrate. Then, on this oxide, one proceeds with the treatments of dehydration and reduction, as in Example 1. The thusly obtained ferrous ferric oxide doped with cobalt and with zinc has a coerciveness of 680 oersteds, an alkalinity of about 0.08 meq/g, and acicularity ratio of 25 to 35.

One uses the oxide obtained according to this Example to prepare a magnetic tape by applying to a support a layer of a dispersion of the oxide in a copoly (vinyl acetate vinyl chloride) binder. One calenders the tape obtained and then tests it on a Philips magnetescope of the LDL 1002 type. One notes that the output level is approximately 3 dB above that of a doped gamma ferric oxide tape having the same coercivity. After 10 passages of the tape, the output level does not change in an appreciable manner.

EXAMPLE 4

Using the procedure of Example 1, one prepares, in a 10 liter container, 3.5 liters of an aqueous solution containing 145 g/l (3.6 gm. moles/liter) of NaOH at 40°C, calculated to provide 820% excess. One rapidly pours in through the rotatory saucer 1 liter of aqueous solution containing 200 g (0.69 gm. moles/liter) of ferrous sulfate. After dilution, and oxidation of the resulting precipitate as in Example 1, one brings the dispersion to boiling and boils for 1 hour, filters, washes with water containing 100 mg/l of calcium ions added as calcium chloride, then dries the resulting $\alpha$ ferric oxide hydrate. After dehydration and reduction of these crystals as in Example 1, one obtains ferrous ferric oxide having an alkalinity of 0.06 meq/g of oxide and an acicularity ratio of between 20 and 35. The contents of Na and Ca ions are 0.08 and 0.45, respectively, expressed as grams per 100 grams of oxide.

Using the procedure of the previous Examples one can use the thusly prepared oxide for the manufacture of a magnetic tape.

The invention has been described in detail with particular reference to preferred embodiments thereof, but it will be understood that variations and modifications can be effected within the spirit and scope of the invention.

We claim:

1. Acicular ferrous ferric oxide consisting essentially of acicular crystals that have an acicularity ratio of at least 15, a coefficient of polydispersion above 2, and which comprise alkali metal ions which impart a basicity of at least 0.04 meq. per gram to said oxide.

2. Acicular ferrous ferric oxide according to claim 1 in which said crystals have an acicularity ratio of at least 20 and a basicity in the range of 0.04 to about 0.2 meq. per gram of oxide.

3. Acicular ferrous ferric oxide according to claim 1 in which said crystals also comprise alkaline earth metal ions in a concentration of about 0.25 to about 1%, by weight, based on oxide.

4. Acicular ferrous ferric oxide according to claim 3 in which said alkali metal ions are sodium or potassium ions, said basicity is in the range of 0.04 to about 0.2 meq. per gram of oxide and said alkaline earth metal ions are calcium ions.

5. A product for magnetic recording comprising a support and acicular ferrous ferric oxide as defined in claim 3.

6. Acicular ferrous ferric oxide according to claim 1 in which said crystals comprise doping metal ions of at least one of cobalt, nickel, chromium, zinc, manganese and cadmium in a concentration of about 1 to about 6%, by weight, based on oxide, in addition to said alkali metal ions.

7. Acicular ferrous ferric oxide according to claim 6 in which the basicity is in the range of 0.04 to about 0.2 meq. per gram of oxide.

8. Acicular ferrous ferric oxide according to claim 7 in which said alkali metal ions are sodium ions and said doping metal ions are cobalt ions.

9. A product for magnetic recording comprising a support and a layer of non-magnetic binder in which there is dispersed acicular ferrous ferric oxide as defined in claim 7.

10. A product for magnetic recording according to claim 9 in which said doping metal ions are ions of at least two of the metals cobalt, nickel, chromium, manganese, zinc or cadmium.

11. A product for magnetic recording according to claim 9 in which said crystals comprise alkaline earth metal ions in a concentration of about 0.25 to about 1%, by weight, based on oxide.

12. A product for magnetic recording according to claim 11 in which said alkaline earth metal ions are calcium ions.

13. A product for magnetic recording comprising a support and a ferrous ferric oxide according to claim 6 in which said doping metal ion is cobalt.

14. A product for magnetic recording comprising a support and acicular ferrous ferric oxide as defined in claim 1.

15. A product for magnetic recording according to claim 14 comprising at least two superimposed magnetic recording layers on the same surface of said support and said acicular ferrous ferric oxide is in the outermost magnetic recording layer with respect to said support.

16. A process for preparing acicular ferrous ferric oxide crystals for magnetic recording which comprises
adding under non-oxidizing conditions, at a temperature below about 60°C, an aqueous solution of ferrous salt to an aqueous solution of a stoichiometric excess of an alkaline hydroxide while substantially avoiding local excesses of said ferrous salt, to form an aqueous dispersion of ferrous hydroxide particles, said alkaline hydroxide being present in said aqueous dispersion in a concentration of at least a 500% stoichiometric excess;
introducing oxygen into said dispersion at a temperature of about 20° to about 60°C for a period of time sufficient to convert said ferrous hydroxide particles to crystals of alpha ferric oxide hydrate, the concentration of ferrous salt in said aqueous solution being such that the concentration of said alpha ferric oxide hydrate formed in said dispersion is less than about 15 grams per liter;
discontinuing introduction of said oxygen into said dispersion;
boiling said dispersion to obtain further crystallization of said alpha ferric oxide hydrate crystals;
dehydrating said alpha ferric oxide hydrate crystals to form alpha ferric oxide;
reducing said alpha ferric oxide to form ferrous ferric oxide and recovering said ferrous ferric oxide.

17. A process according to claim 16 which comrpises directing said solution of ferrous salt to a suction zone created in the midst of said alkaline hydroxide solution where said ferrous salt solution undergoes a lamellar stretching such that it penetrates into said alkaline hydroxide solution in the form of a sheet of large specific area.

18. A process according to claim 16 which comprises the additional step of introducing doping metal ions of at least one of Cobalt, nickel, chromium, zinc, manganese and cadmium.

19. A process according to claim 18 in which said doping metal ions are present in said ferrous salt solution.

20. A process according to claim 19 in which said doping metal ions are cobalt ions.

21. A process according to claim 19 which comprises the step of introducing alkaline earth metal ions in addition to said doping metal ions.

22. A process according to claim 21 in which said alkaline earth metal ions are calcium ions.

* * * * *